June 5, 1951 W. W. DEWHURST 2,555,475

RADIO RECEIVER TUNING MECHANISM

Filed April 30, 1946

Inventor
Wallace W. Dewhurst

By Philip G. Cooper

Attorney

Patented June 5, 1951

2,555,475

UNITED STATES PATENT OFFICE 2,555,475

RADIO RECEIVER TUNING MECHANISM

Wallace W. Dewhurst, Oaklyn, N. J., assignor to Radio Corporation of America, a corporation of Delaware Application April 30, 1948, Serial No. 24,393

7 Claims. (Cl. 250—40)

This invention relates generally to permeability tuning systems, and particularly relates to a mechanism for aligning the signal frequency input circuit and the oscillator tank circuit of a superheterodyne radio receiver for the purpose of obtaining proper tracking.

It is conventional practice to tune the signal frequency input circuit and the oscillator tank circuit of a superheterodyne broadcast receiver by paramagnetic cores. A paramagnetic core may consist of powdered iron or any other suitable material having paramagnetic properties, that is, which has a magnetic permeability which is larger than that of vacuum. It is also conventional practice to tune the input circuit and the oscillator tank circuit of a receiver in unison by moving the cores of the two circuits simultaneously by means of a common cable drive. In that case, however, it is important to obtain proper tracking so that the resonant frequency of the oscillator tank circuit always has a value properly related to that of the input circuit. To this end, it is necessary to adjust or align the relative positions of the two cores with respect to their associated coils. Since the two cores are usually interconnected by a common drive, they cannot normally be moved independently to adjust their relative positions. Hence, this was usually done by moving one of the coil forms in its support until the correct position is obtained whereafter the coil form is usually locked by a set screw. Such an alignment procedure, however, is quite unsatisfactory because it does not permit a continuous adjustment and because it cannot be performed by unskilled persons. Furthermore, tightening of the set screw will usually cause a slight movement of the coil form, thus necessitating realignment.

It is an object of the present invention, therefore, to provide, in a radio receiver having a permeability-tunable signal-frequency input circuit and an oscillator tank circuit, novel mechanism for adjusting the relative position of the cores of the two circuits with respect to their coils.

Another object of the invention is to provide novel mechanism for adjusting the relative position of one of the cores of a signal-frequency resonant circuit with respect to another core associated with another resonant circuit while maintaining the relative position of the other core fixed with respect to its coil.

A further object of the invention is to provide inexpensive and efficient means for the purpose of aligning or adjusting the permeability tuning system of a broadcast receiver so as to obtain proper tracking, and to maintain the correct alignment.

A radio receiver conventionally includes at least two resonant circuits, that is, a signal-frequency input circuit and an oscillator tank circuit. Each of the circuits may comprise a stationary coil and a core for the coil. In order to tune the receiver there is provided mechanism for moving the cores in unison relative to their associated coils. This mechanism may comprise a flexible drive between the two cores which includes a yieldable portion such as a spring. Means are provided for guiding the flexible drive so as to move the cores along a predetermined path. This guide means includes, in accordance with the present invention, an eccentric guide member which is rotatable for adjusting the relative position of one of the cores with respect to the other core. Furthermore, friction means may be provided for maintaining the relative position of the other core fixed with respect to its associated coil when the guide member is rotated. The receiver is tuned by a control element which actuates the flexible drive and the cores.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
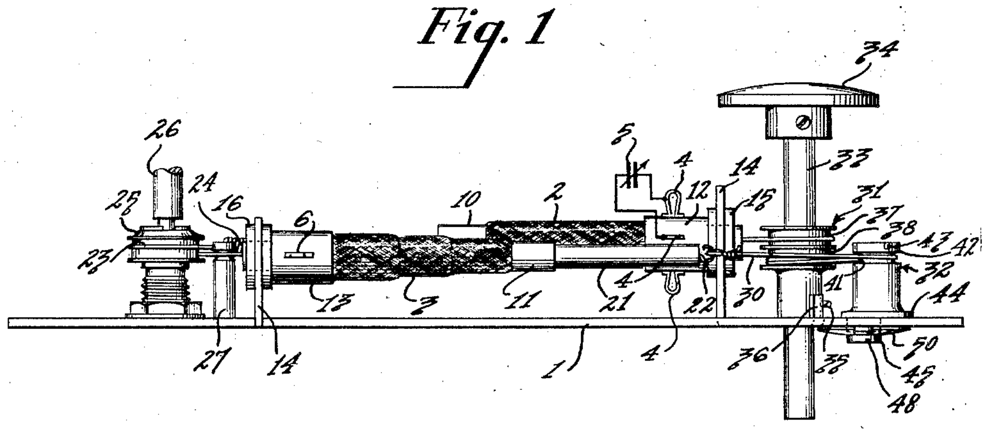
Fig. 1 is a side elevational view of a portion of a radio receiver chassis including two permeability tuned coil and core assemblies and mechanism for adjusting the relative position of the two cores.
Figure 2:
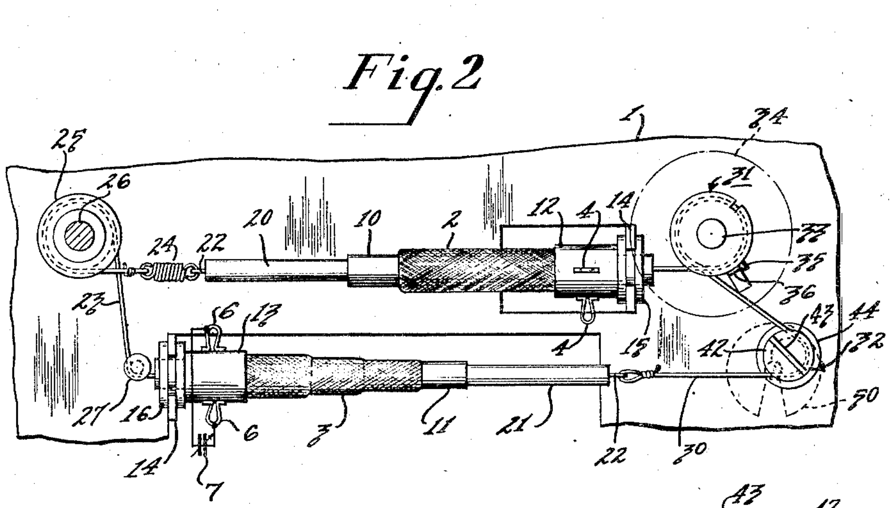
Fig. 2 is a plan view of a portion of the receiver chassis of Fig. 1.

Referring now to the drawing, there is illustrated radio receiver chassis plate 1 on which are mounted two coils 2 and 3. Coil 2 forms part of the oscillator tank circuit of the superheterodyne receiver and is provided with terminal lugs 4 across two of which condenser 5, shown schematically, may be connected to form a resonant tank circuit. Coil 3 is provided with terminal lugs 6 across which condenser 7 is connected to provide a resonant signal-frequency input circuit.

Coils 2 and 3 are each wound on a suitable coil form 10 and 11 respectively which may be of cylindrical shape and may consist of a phenolic resin or other insulating material. Terminal lugs 4 and 6 are secured to insulating sleeves 12 and 13 respectively. Coils 2 and 3 are fixedly mounted on chassis plate 1 by means of bent up ears 14, 14. This is effected by means of rubber grommets 15, 16 through which coil forms 10 and 11 respectively extend and which are mounted within a central groove in ears 14, 14.

Cores 2 and 3 are tunable over a predetermined frequency range by means of paramagnetic cores 20 and 21 which may, for example, consist of powdered iron. Cores 20, 21 are guided within coil forms 10, 11 respectively. Each end of cores 20, 21 is provided with a hook 22, and the two cores 20, 21 are movable in unison by a flexible cable drive. The cable drive comprises cable 23 secured to the hook of core 20 by spring 24 and fastened to core 21. Cable 23 is guided by idler pulley 25 rotatably mounted on shaft 26 and by stud 27 which is fixed to chassis plate 1 in any suitable manner such as by riveting. Shaft 26 may extend through chassis plate 1 and may also be used, for example, for adjusting the volume control of the receiver, not illustrated.

The other two ends of cores 20 and 21 are interconnected by flexible cable 30 secured to their hooks 22. Cable 30 is guided by drive pulley 31 and by eccentric stud 32 which is stationary. Drive pulley 31 is fixed to control shaft 33 supporting control knob 34 for tuning the receiver. Control shaft 33 has pin 35 extending therethrough which cooperates with fixed stop 36 to limit the rotation of the shaft to approximately 320 degrees. Stop 36 may be a bent portion of chassis plate 1.

Figure 3:
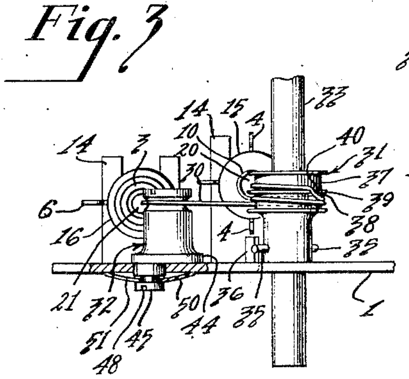
Fig. 3 is an end elevational view of the portion of the chassis of Fig. 1.

Drive pulley 31 is provided with two grooves 37 and 38 separated by center flange 39. Flexible cable 30 is passed three times around grooves 37, 38 of pulley 33 and passes through slot 40 in center flange 39, as clearly shown in Fig. 3. Thus, cable 30 is retained by friction on drive pulley 31. Cable 30 is wrapped about one quarter turn about groove 41 of eccentric stud 32. By rotating control knob 34, both cores 20 and 21 will move in unison to adjust the resonant circuits including coils 2, 3 thereby to tune the receiver.

The resonant circuits, including coils 2 and 3, are adjusted in the following manner. At first, cores 20 and 21 are removed from their coils as far as possible whereupon condensers 5 and 7 are adjusted by testing the set at a predetermined high frequency. Thereafter, the set is tested at a lower frequency and the relative position of one of the cores such as core 21 with respect to core 20 is now adjusted so that proper tracking is obtained.

Figures 4, 5:
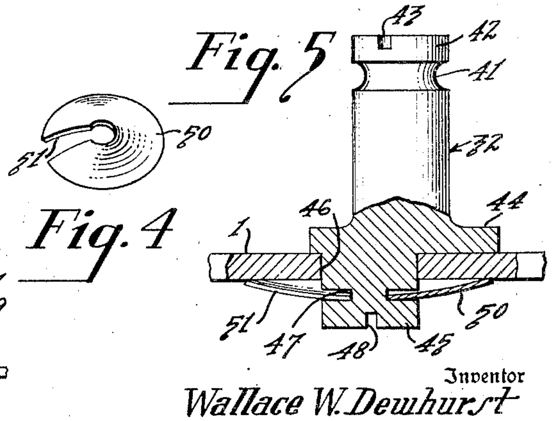
Fig. 4 is a view in perspective of a spring washer forming part of the adjusting mechanism.
Fig. 5 is an enlarged elevational view, partly in section, illustrating an eccentric stud for adjusting the relative position of the two cores.

In accordance with the present invention this is effected by eccentric stud 32. Stud 32 has an upper head 42 provided with a slot 43 for receiving a screw driver (Fig. 5). Stud 32 further has a base portion 44 and an eccentric lower head 45 extending through a suitable aperture 46 in base plate 1 and having a neck 47. Aperture 46 is of such a size as to permit lower head 45 of the stud to pass therethrough. Lower head 45 may also be provided with a slot 48 for receiving a screw driver. Stud 32 is locked and retained in any position by spring washer 50 having a slot 51 for sliding it through neck portion 47 of the stud. Since lower head 45 is eccentric with respect to the main body 42 and guiding groove 41 of the stud, rotation of stud 32 will either pull out core 21 against the action of take-up spring 24 or will allow core 21 to move into coil 3 while spring 24 will take up the slack. Thus, the relative position of core 21 with respect to core 20 may be adjusted continuously and stud 32 will be locked in its adjusted position by spring washer 50.

On the other hand, since cable 30 is frictionally retained by drive pulley 31, the relative position of core 20 will remain fixed with respect to its coil 2. Once core 21 has been set or aligned with respect to core 20, the two cores 20, 21 will then move in unison in their new relative positions.

There has thus been described a mechanism for adjusting the permeability tuning system of a radio receiver which may include two coils and their associated cores. The mechanism permits adjustment of the relative position of one of the cores with respect to the other core while maintaining the relative position of the other core fixed with respect to its coil. The mechanism is inexpensive to manufacture and the adjustment may be made by an unskilled person.

What is claimed is:

1. In a radio receiver, two resonant circuits, each including a stationary coil, a core for each of said coils, mechanism for moving said cores in unison relative to their associated coils to vary the resonant frequencies of said circuits, said mechanism comprising a flexible drive member between said cores including a yieldable portion, means for guiding said flexible drive member to move said cores along a predetermined path, said guide means including an eccentric guide member rotatable for adjusting the relative position of one of said cores with respect to the other core, and a control element for moving said drive member and said cores.

2. In a radio receiver, two resonant circuits, each including a stationary coil, a core for each of said coils, mechanism for moving said cores in unison relative to their associated coils to vary the resonant frequencies of said circuits, said mechanism comprising a flexible connection between said cores including a spring, means for guiding said flexible connection to move said cores along a predetermined path, said guide means including an eccentric guide member rotatable for adjusting the relative position of one of said cores with respect to the other core, friction means for maintaining the relative position of said other core fixed with respect to its associated coil when said guide member is rotated, and a control element for moving said connection and said cores.

3. In a radio receiver, two resonant circuits, each including a stationary coil, a core for each of said coils, mechanism for moving said cores in unison relative to their associated coils to vary the resonant frequencies of said circuits, said mechanism comprising a flexible connection between said cores including a yieldable portion, means for guiding said flexible connection to move said cores along a predetermined path, said guide means including an eccentric guide member rotatable for adjusting the relative position of one of said cores with respect to the other core, a drive member provided for the portion of said connection between said guide member and said other core, said drive member having friction means for keeping said connection and said other core substantially in a fixed position when said guide member is rotated, and a control element for moving said drive member.

4. In a radio receiver, a signal frequency input circuit and an oscillator tank circuit, each of said circuits including a coil, a core for each coil movable with respect to its associated coil for tuning said circuits, a first cable having a yieldable portion interconnecting one end of each of said cores, guide members for guiding said first cable, a second cable interconnecting the other end of each of said cores, a retaining member bearing a plurality of turns of said second cable to frictionally retain said second cable, a control member for moving said cables and said cores in unison and an eccentric stud for guiding the portion of said second cable arranged between said retaining member and one of said cores and rotatable to adjust the relative position of said one of said cores with respect to the other core while the relative position of said other core is maintained fixed with respect to its associated coil by said retaining member.

5. In a radio receiver, a signal-frequency input circuit and an oscillator tank circuit, each of said circuits including a coil, a core for each coil movable within its associated coil for tuning said circuits, a first cable interconnecting one end of each of said cores, guide members for guiding said first cable, a second cable interconnecting the other end of each of said cores, a spring provided between said cables and cores, an actuating member bearing a plurality of turns of said second cable to frictionally retain said second cable, a control member for moving said actuating member, an eccentric stud for guiding the portion of said second cable arranged between said actuating member and said input circuit core and rotatable to adjust the relative position of said input circuit core with respect to said tank circuit core while the relative position of said oscillator tank circuit core is maintained fixed with respect to its associated coil by said actuating member and an element for locking and retaining said stud in its adjusted position.

6. In a radio receiver, a signal-frequency input circuit and an oscillator tank circuit, each of said circuits including a stationary coil, a core for each coil movable axially within its associated coil for tuning said circuits, a first cable and a spring interconnecting one end of each of said cores, guide members for guiding said first cable, a second cable interconnecting the other end of each of said cores, an actuating member bearing a plurality of turns of said second cable to frictionally retain said second cable, a control member for moving said actuating member, an eccentric stud for guiding the portion of said second cable arranged between said actuating member and said input circuit core and rotatable to adjust the relative position of said input circuit core with respect to said tank circuit core while the relative position of said oscillator tank circuit core is maintained fixed with respect to its associated coil by said actuating member, and a spring washer for locking and retaining said stud in its adjusted position.

7. In a radio tuning drive system, a pair of movable tuning cores, a flexible drive linkage connected to both tuning cores to move said cores in unison in opposite directions, an idler pulley, means for guiding said drive linkage along a predetermined path, said means including said idler pulley, a yieldable spring portion connected in said linkage between one of said cores and said pulley, and an eccentric guide member included in said means and mounted to guide said linkage at a position between said cores to pull out one core against the yieldable portion thereby adjusting the relative position of one of said tuning cores with respect to the other.

WALLACE W. DEWHURST.

REFERENCES CITED

The following references are of record in the file of this patent:

UNITED STATES PATENTS

| Number | Name | Date |
|---|---|---|
| 1,631,788 | Bennett | June 7, 1927 |
| 2,255,680 | Sands et al. | Sept. 9, 1941 |
| 2,267,740 | Knox | Dec. 30, 1941 |
| 2,389,986 | Koch | Nov. 27, 1945 |